Patented June 3, 1941

2,244,645

UNITED STATES PATENT OFFICE 2,244,645

PROCESS OF DIMERIZATION

Ralph A. Jacobson, Landenberg, Pa., assignor to E. I. du Pont de Nemours & Company, Wilmington, Del., a corporation of Delaware No Drawing. Application February 14, 1940, Serial No. 318,832

10 Claims. (Cl. 260—485)

This invention relates generally to chemical processes employing alpha-substituted acrylic compounds. In its more limited aspects, the invention deals with methods for causing alpha-substituted acrylic compounds when suitably activated, to combine with themselves in definite proportions, producing definite chemical compounds. This invention particularly relates to the catalytic vapor phase dimerization of alpha-substituted acrylic compounds.

It is an object of this invention to prepare dimers of alpha-substituted acrylic compounds. Another object is to dimerize alpha-substituted acrylic compounds in a vapor-phase process. A further object is to provide appropriate catalysts for the said process. Yet another object is to prepare dimethyl alpha, alpha'-dimethyl-dihydromuconate and the dimethyl ester of trimethyl glutaconic acid by the vapor-phase, catalytic dimerization of methyl methacrylate. Other objects will be apparent from a consideration of the specification and appended claims.

According to this invention, these objects are accomplished by contacting an alpha-substituted acrylic compound, in the vapor phase, with a dehydration-type catalyst at a temperature above the boiling point of the alpha-substituted acrylic compound, but below that at which substantial cracking occurs.

The term "dehydration-type catalyst" refers to a well-known group of catalysts which facilitate the removal of water in reactions such as the formation of acetic anhydride from acetic acid, olefines from alcohols, and the like. Although it should not be inferred that the present process involves a dehydration, it has nevertheless been found that dehydration-type catalysts promote the formation of dimeric alpha-substituted acrylic compounds from the corresponding monomers. Among the dehydration-type catalysts suitable for the invention may be mentioned oxides of the second, fourth, fifth and sixth groups of the periodic table, such as silica gel, thorium oxide, copper oxide, uranium oxide, alumina, tungsten oxide, and others of the above groups. They may be used alone or admixed with each other. It is especially desirable to modify the simple oxide-gel catalysts with acidic substances, such as phosphoric acid and heteropoly acids, for example, silicotungstic acid, phosphotungstic acid, phosphomolybdic acid, and borophosphoric acid.

The catalysts of the following patents may be used in practicing the invention: 1,007,516; 1,012,911; 1,050,204; 1,161,200; 1,297,724; 1,520,305; 1,540,446; 1,540,447; 1,895,529; 1,914,722; 2,038,357; 2,018,065; and 2,120,702.

The compounds which may be dimerized in the vapor phase process of the invention are the alpha-substituted acrylic compounds, particularly those in which the substituent is a lower alkyl radical such as the alpha-methyl acrylic, alpha-ethyl acrylic and alpha-propyl acrylic esters, acids, nitriles, amides, anhydrides and acid halides. The alpha-methyl acrylic esters are particularly suitable, examples of which are the methyl, ethyl, propyl, isopropyl butyl, isobutyl, amyl, octyl, lauryl, nonyl, and octadecenyl esters of methacrylic acid. The methacrylic esters of the alcohols formed by the hydrogenation of oxides of carbon, by the carboxyl reduction of naturally-occurring fatty acid glycerides, and by the reduction of acids formed by oxidation of paraffins and cycloparaffins, are likewise suitable where vaporizable without decomposition. The preferred methacrylic ester is methyl methacrylate, and the dimerization thereof will be hereinafter further described.

The dimerization process of the present invention is conducted in the vapor phase, and is therefore well adapted for continuous operation. An inert carrier gas is preferably employed to assist in the vaporization of the alpha-substituted acrylic compound, and to afford a better control of the time of contact and the reaction temperature. Such control is accomplished by regulating the quantity and temperature of the carrier gas. Nitrogen, hydrogen and carbon monoxide are suitable carrier gases, of which nitrogen is preferred.

The reaction temperature is above the boiling point of the alpha-substituted acrylic compound, but below that at which substantial cracking takes place. It has been found that temperatures of from about 125° C. to 550° C. are suitable, and preferably from about 175° C. to 375° C. for best results. Below 125° C., difficulty in complete vaporization may be encountered, while above 550° C. excessive cracking with attendant carbon deposition and loss of reactants is to be expected.

The time of contact of the reactant with the catalyst may be from about five seconds to about one hundred seconds, although from about five seconds to about 30 seconds is usually preferable. In general, it may be stated that the contact time will be controlled so as to vary inversely with the reaction temperature. Where high reaction temperatures are employed, a short time of contact will be preferred.

The dimerization may be carried out at atmospheric, reduced or super-atmospheric pressures. It is preferable to operate at atmospheric pressure, since equipment is simplified thereby, but pressures of forty atmospheres and higher are useful.

The following examples will serve to illustrate the preferred embodiment of the invention:

Example I

Methyl methacrylate is vaporized and passed at the rate of 39.6 grams per hour together with dry nitrogen at the rate of 10.8 liters per hour into a vertically-mounted reaction tube containing two hundred cubic centimeters of phosphoric acid-on-silica-gel catalyst heated to about 350° C. The catalyst is prepared by soaking dry silica gel in 85% phosphoric acid, drying, and finally baking at about 110° C. The vapors from the reaction tube are condensed and collected in a suitable receiver. During a five-hour run, 123 grams of liquid condensate is obtained from 153 grams of methyl methacrylate processed, which liquid condensate upon fractional distillation at atmospheric and later reduced pressure yielded 106 grams of unchanged methyl methacrylate, B. P. 100° C., and 9 grams of a higher-boiling product. This product is a binary mixture, boiling point 75° C.–81° C./30 mm., of methyl methacrylate dimer with methyl methacrylate, the dimer predominating in quantity. The boiling point of the pure dimer is 95–96° C./3 mm.

Example II

Methyl methacrylate is vaporized and passed at the rate of 58.4 grams per hour together with hydrogen at the rate of 17 liters per hour into a reaction tube containing 350 cubic centimeters of a dehydration-type catalyst heated to a temperature of about 350° C. The dehydration-type catalyst is composed of 70% of 8–14 mesh silica gel and 30% of mixed thorium, copper, and uranium oxides. The time of contact with the catalyst is 18.4 seconds, and the number of volumes of gaseous reactant passed per hour per volume of catalyst, under standard conditions, e. g., the "space velocity," is 85.7. The vapors from the reaction tube are condensed and collected in a suitable receiver. By fractional distillation, from 285 grams of condensate, 275 grams of unchanged methyl methacrylate is separated, and 10 grams of the pleasant-smelling, binary mixture, boiling point 76° C./30 mm., predominating in methyl methacrylate dimer, as described in Example I, is recovered.

Example III

Two hundred cubic centimeters of phosphoric acid-on-silica gel catalyst, prepared as in Example I, is charged into a vertical, steel reaction-tube adapted for operation under superatmospheric pressures and equipped with a suitable feeding device and high-pressure receivers. On top of the catalyst is charged two hundred cubic centimeters of 8–14 mesh fused quartz, to act as a vaporizing section. The apparatus is sealed, filled with nitrogen to a pressure of 500 lbs./sq. in., heated to an internal temperature of 200°–218° C., and methyl methacrylate is pumped into the top of the reaction tube at the rate of 3.3 grams per minute. The methyl methacrylate is vaporized from the fuzed quartz, partially converted in the catalyst bed, and the monomer-dimer mixture is condensed in a steel trap. The accumulated liquid condensate is purged, from time to time, through a high-pressure release valve. From 470 grams of methyl methacrylate processed during 2.4 hours, 360 grams of condensate is obtained with 90 grams of condensate remaining in the apparatus. By fractional distillation, 350 grams of unchanged methyl methacrylate is recovered, and 10 grams of methyl methacrylate dimer, boiling point 95–96° C./2 mm., is secured as a final product.

It has been identified as dimethyl alpha, alpha'-dimethyl dihydromuconate, having the structure:

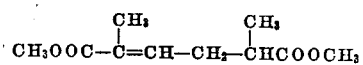

Example IV

Two hundred cubic centimeters of silica gel catalyst, prepared by conventional methods, is charged into the steel apparatus of Example III, the apparatus is sealed, filled with nitrogen to about 34 atmospheres pressure, heated to about 350° C. internal temperature, and methyl methacrylate is pumped into the reaction tube at the rate of 0.94 gram per minute. Under these conditions, the methyl methacrylate is in contact with the catalyst for 85 seconds, and the gaseous space velocity, (as above defined), is about 63 volumes of vapor per volume of catalyst per hour. From 246 grams of methyl methacrylate processed during 3.25 hours, 206 grams of light-brown condensate having a viscosity higher than that of methyl methacrylate, is obtained. The liquid condensate is fractionally distilled, whereupon 126 grams of unchanged methyl methacrylate is recovered, and in addition, (based on material charged), 1% of a cyclic ketone, B. P. 52° C./13 mm., having a strong, camphor-like odor; 8.56% of an ester, B. P. 75° C./3 mm.; and 5.5% of the methyl methacrylate dimer, B. P. 95–96° C./3 mm., referred to in Example III. The ester recovered above in 8.56% yield, B. P. 75° C./3 mm., is an isomeric dimer of methyl methacrylate. It has been identified as the dimethyl ester of trimethyl glutaconic acid, having the structure,

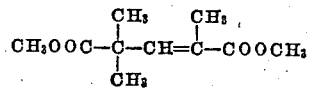

as evidenced by hydrolysis to a mixture of the cis and trans isomers of alpha, alpha, gamma-trimethyl glutaconic acid, M. P. 103–120° C., with the corresponding cis anhydride, M. P. 88.5° C. (Cf. Perkin and Smith, J. Chem. Soc., 83, 771 (1903); Cahn, Gibson, Penfold and Simonsen, J. Chem. Soc. 1931, 286). The formation of the isomeric dimer is favored by the use of elevated temperatures and superatmospheric pressures, for example, temperatures of from 300° C. to 550° C., and pressures of from 5 to 50 atmospheres or higher.

From the foregoing description and examples, it is apparent that the vapor-phase process of this invention affords a practicable and convenient method of dimerizing alpha-substituted acrylic compounds. The process is well adapted for continuous-flow operation, thus facilitating recycling of unconverted initial material. The dimers of this invention are valuable intermediates for the preparation of resins, plasticizers, wax-blending agents, and many other products.

While the invention has been particularly described with reference to individual alpha-substituted acrylic compounds, it is also useful for preparing mixed dimers of the above, by processing a mixture of two or more alpha-substituted acrylic compounds. Thus a great many new dimers may be prepared.

I claim:

1. The process of preparing dimethyl alpha, alpha' dimethyl dihydromuconate which comprises passing vaporized methyl methacrylate together with hydrogen in contact with a catalyst consisting of silica gel admixed with oxides of thorium, copper and uranium, the said catalyst being heated to a temperature of about 350° C., allowing the vapors to remain in contact with the catalyst for a period of about 5 to 30 seconds, condensing the vapors, fractionally distilling the condensate to obtain a fraction consisting predominately of dimethyl alpha, alpha'-dimethyl dihydromuconate, and a recovered methyl methacrylate fraction, and submitting the recovered methyl methacrylate fraction to reaction as before.

2. The process of preparing the dimethyl ester of trimethyl glutaconic acid which comprises passing vaporized methyl methacrylate together with nitrogen under a pressure of about 34 atmospheres in contact with a silica gel catalyst heated to a temperature of about 350° C., allowing the vapors to remain in contact with the catalyst for about 85 seconds, condensing the vapors, fractionally distilling the condensate to obtain a recovered methyl methacrylate fraction, a product fraction containing dimethyl alpha, alpha'-dimethyl dihydromuconate, and a further product fraction containing the dimethyl ester of trimethyl glutaconic acid, and submitting the recovered methyl methacrylate fraction to the reaction as before.

3. The process of dimerizing a compound selected from the group consisting of alpha, lower alkyl substituted acrylic acids, esters, amides, nitriles, anhydrides and acid halides which comprises introducing said compound in the vapor state into a reaction vessel containing a dehydration type catalyst, contacting the said compound with the catalyst, and thereafter withdrawing the reaction vapors from the vessel.

4. The process of claim 3 wherein the compound introduced into the reaction vessel is a dimerizable methacrylic ester, the reaction is carried out in the presence of an inert gas, and the vapors are contacted with the catalyst heated to a temperature substantially above the boiling point of the compound but below that at which substantial cracking would take place.

5. The process of dimerizing methyl methacrylate which comprises introducing said compound in the vapor state together with an inert gas, into a reaction vessel containing a dehydration type catalyst heated to a temperature substantially above the boiling point of the compound but below that at which substantial cracking would take place, contacting the compound with the said catalyst for a dimerizing interval of time, and thereafter withdrawing the reaction vapors from the vessel.

6. The process of claim 5 wherein the time of contact is from about 5 seconds to about 100 seconds.

7. The process of claim 5, when carried out under a pressure of at least 5 atmospheres, whereby the dimethyl ester of trimethyl glutaconic acid is formed.

8. The process of claim 5 wherein the catalyst is phosphoric acid-on-silica gel, the reaction temperature is about 350° C., and the inert gas is nitrogen.

9. The process of dimerizing a methacrylic ester which comprises introducing a methacrylic ester in the vapor state into a closed reaction vessel containing a dehydration type catalyst, contacting the said ester with the catalyst, and thereafter withdrawing the reaction vapors from the vessel.

10. The process of dimerizing a methacrylic compound selected from the group consisting of methacrylic acid, methacrylic amide, methacrylonitrile, methacrylic anhydride, methacrylic esters and methacrylic acid halides which comprises introducing said acid compound in the vapor state into a closed reaction vessel containing a dehydration type catalyst, contacting the said compound with the catalyst, and thereafter withdrawing the reaction vapors from the vessel.

RALPH A. JACOBSON.